3,117,136
UNSYMMETRICAL ACETALS CONTAINING THE 3,4-METHYLENEDIOXYPHENYL GROUP STABILIZED AGAINST DISPROPORTIONATION AND METHOD OF PRODUCING SAME
Oscar F. Hedenburg, Pittsburgh, Pa., assignor to Rex Research Corporation, Toledo, Ohio, a corporation of Delaware
No Drawing. Filed July 20, 1960, Ser. No. 44,012
10 Claims. (Cl. 260—340.5)

This invention relates to new chemical compounds especially valuable for use in insecticidal compositions as synergists for the insecticidal effectiveness of pyrethrins and allethrin and other insecticidally active compounds closely related to pyrethrins and allethrin, for instance, cyclethrin and furethrin. The invention includes the new compounds, per se, and effective methods for producing and stabilizing them and also includes insecticidal compositions containing pyrethrins, allethrin or the like, synergized by one or more of the compounds of this invention.

The new compounds of my present invention may be generally characterized as the acetals of two dissimilar alcohols which may be represented respectively by R' and R", R' being a high-boiling alcohol containing the methylenedioxybenzyl group and R" being an alcohol of the formula R—[—O—$(CH_2)_m$—$]_n$—OH, R representing alkyl of 1 to 4 carbon atoms, $m$ being an integer 2 or 3 and $n$ being an integer 1 or 2.

These new compounds may be represented structurally by the formula:

(1) 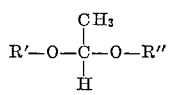

In accordance with the methods of my present invention, these new compounds are produced by reacting the first-mentioned alcohol, i.e., R', which contains the methylenedioxybenzyl group, with a vinyl alkyl ether of the formula $CH_2$=CH—O—R", R" having the previously-noted significance, in the presence of a small amount of a strong, nonvolatile acid.

The reaction may be carried out in the presence of a nonreactive, volatile solvent, advantageously benzene. Because of the extreme reactivity of the alcohol with the ether in the presence of the acid catalyst, the reaction should be carried out at subnormal temperature, i.e., in the range of 0° to 10° C., usually about 2° to 6° C., and the reactants brought together quite slowly, while cooling the mixture to prevent excessive temperature rise.

According to my presently preferred procedure, I dissolve the alcohol, R', in benzene containing the acid catalyst, cool the mixture to about 2°–3° C. and add the ether slowly dropwise, while stirring and cooling the mixture to maintain a temperature within the desired range. After all of the ether has been added, the solution is permitted to stand at about 1° C. for about one hour, and the acid present in the solution is then neutralized by adding its equivalent of sodium hydroxide, or other base, in methanol. The salt formed by the neutralization precipitates upon standing and is finally filtered from the solution, and the benzene and methanol distilled from the solution at reduced pressure by heating to about 85° C.

The vinyl alkyl ethers used in accordance with my present invention may, as previously indicated, be represented by the structural formula:

(2) 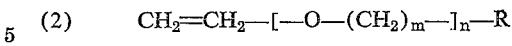

R, $m$ and $n$ being as previously noted, and may be prepared, for instance, by reacting acetylene with the corresponding alcohol.

Though any of the vinyl alkyl ethers represented by the foregoing Formula 2 may be used with advantage, I have produced especially effective synergists using vinyl ethoxyethoxyethyl ether or vinyl methoxyethyl ether.

As the alcohol constituent, I may, for instance, use piperonyl alcohol; however, especially advantageous results have been obtained through the use of 3,4-methylenedioxyphenyl propyl thioethyl alcohol, i.e., safrole thioethyl alcohol, or 3,4-methylenedioxyphenyl isopropyl thioethyl alcohol, i.e., isosafrole thioethyl alcohol.

As the acid catalyst, I have in the operations specifically described herein used toluenesulfonic acid. However, in lieu thereof, or in conjunction therewith, other strong, nonvolatile acids may be used, for instance naphthalenesulfonic acid or benzenesulfonic acid. The proportion of the acid catalyst may be varied somewhat but should usually be present in an amount equivalent to about 0.1 gram per mole of the methylenedioxyphenyl alcohol constituent.

The unsymmetrical acetals, represented by the foregoing Formula 1, have been found to be especially effective as synergists for pyrethrins and allethrin in insecticidal compositions, as previously noted, making it possible to use smaller proportions of those active insecticides in the production of effective insecticidal compositions.

I have found, however, that these unsymmetrical acetals are relatively unstable and upon standing tend to disproportionate or rearrange into equilibrium mixtures of the highly effective unsymmetrical acetal and two symmetrical acetals of the alcohols and ethers, respectively, for example:

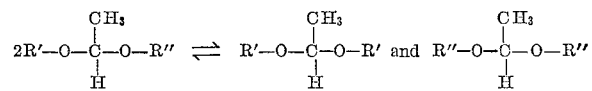

so that, where there is no vaporization loss, an equilibrium mixture resulting from the reaction will contain about 50 mole percent of the unsymmetrical acetal and about 25 mole percent of each of the symmetrical acetals.

I have found, for instance, that where a high boiling alcohol is reacted with a vinyl n-butyl ether and the product is distilled at reduced pressure, there will be obtained a fraction composed of di-n-butyl acetal, indicating that this disproportionation has occurred.

In one instance, I reacted a high boiling alcohol, 3,4-methylenedioxyphenyl isopropyl thioethyl alcohol, with vinyl ethyl ether in the presence of 0.02 gram of toluenesulfonic acid at a temperature of 2°–8° C. After 40 minutes, the acid was neutralized and I obtained a product weighing 78 grams, which was the calculated yield. This product was kept in an open flask for 7 months and was then found to weigh only 68.5 grams, indicating that diethyl acetal had been formed and evaporated therefrom. Had the product lost all of the diethyl acetal presumed to be present, its weight would have been reduced to 63.25 grams. It appears, therefore, that disproportionation had proceeded to the extent of 64.4% of the calculated amount of diethyl acetal.

In a similar test, 0.2 gram of toluenesulfonic acid was used, i.e., ten times the amount used in the test just noted, and the product recovered was found to weigh 70 grams, showing that disproportionation and loss of diethyl acetal had already occurred. To the resultant 70 grams of product, I added an additional 0.1 gram of toluenesulfonic acid and allowed the mixture to set in an open flask for 10 days, at the end of which time the product weighed 65 grams. Air was drawn through the product at 25° C. resulting in further loss of the weight of the product to 64.5 grams. The acid present in the product was then neutralized by adding an equivalent amount of sodium hydroxide in methanol solution and the oil, free from acid, was then shaken with 100 cc. of normal heptane and was found to be insoluble therein. The mixture was then filtered and the separated oil, after heating to drive off the volatiles present, weighed 62 grams.

The foregoing tests conclusively showed rapid disproportionation of the unsymmetrical acetal in the presence of the strong acid and, further, that the resultant di(3,4-methylenedioxyphenyl isopropyl thioethyl) acetal was not soluble in heptane. The last-mentioned 62-gram product was also found to be only slightly soluble in pyrethrum concentrate No. 20, but was soluble in the concentrate when diluted with odorless base oil.

When tested against houseflies according to the Peet-Grady method, a concentration of 300 milligrams of the product just described and 30 milligrams of pyrethrins in 100 cc. of odorless base oil showed a knockdown of 78.5% and a kill of 50.7%, as compared with an OTI knockdown of 92.8% and a kill of 51.3%.

It is, therefore, a primary objective of my present invention to provide a method for producing these unsymmetrical acetals described above, which have been found to be highly effective as synergists of pyrethrins, allethrin and the like. That objective is accomplished by the method previously described herein.

A further aspect of the invention has for its object the stabilizing of these unsymmetrical acetals against disproportionation.

As will be apparent from the foregoing disclosure, the reaction resulting in the formation of these unsymmetrical acetals requires equimolar proportions of the alcohol R' and the ether R". Assuming, for instance, that, as the alcohol R', the isosafrole thioethyl alcohol is used, the disproportionation will result in the formation of the di(isosafrole thioethyl) acetal. This and other corresponding acetals of the alcohol R' have been found to be relatively ineffectual synergistically and to be responsible for the insolubility of the reaction product in hexane, pyrethrum extract No. 20, and the like.

I have discovered that disproportionation of these unsymmetrical acetals, resulting in the loss of synergistic effectiveness and solubility, can be prevented by substantially increasing the proportion of the vinyl alkyl ether over that required for the reaction and also adding to the reaction mixture an amount of an alcohol, corresponding to the alcohol radical of the ether, equivalent to the excess of the ether used, whereby the symmetrical acetal of the alcohol R" is produced concurrently with the unsymmetrical acetal. The presence of this acetal has been found to repress the formation of the undesirable acetal

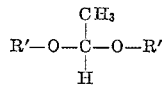

The excess of vinyl alkyl ether, so used, may be varied somewhat, but especially advantageous results have been obtained using an excess equivalent to approximately one-half of that theoretrically required for the reaction.

In carrying out the reaction in accordance with this aspect of my invention, all other operating conditions may be as previously described herein. Upon completion of the reaction and neutralization of the acid, the volatile solvent, e.g., benzene, is readily distilled from the product by reduced pressure distillation, leaving in the reaction mixture the deliberately formed symmetrical formal

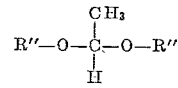

for stabilizing the desired unsymmetrical formal against disproportionation.

The invention and the effective thereof will be further illustrated by the following specific examples:

*Example I*

This example illustrates the broader aspect of the invention in accordance with which equal molar proportions of the high-boiling alcohol and of the vinyl alkyl ether may be used. In this operation, 60 grams (0.25 mole) of 3,4-methylenedioxyphenyl isopropyl thioethyl alcohol was dissolved in 50 cc. of benzene containing 0.02 gram of toluenesulfonic acid. The solution was cooled to 2° C. and 40 grams (0.25 mole) of vinyl ethoxyethoxyethyl ether was slowly added thereto from a dropping funnel, with stirring, over a period of 18 minutes, during which time the temperature was maintained at 2°–3° C.

After all of the ether had been added, the solution was permitted to stand for one hour at about 1° C. Acid present in the solution was then neutralized by adding thereto an equivalent amount of sodium hydroxide in methanol. By this neutralization, a salt was formed and after several hours the solution was filtered to remove the salt and the benzene was distilled from the filtrate at reduced pressure by heating to 85° C. The yield thus obtained weighed 99 grams as compared with a calculated yield of 100 grams.

1.5 grams of the freshly-prepared product was found to be soluble in 7.5 cc. of pyrethrum concentrate No. 20 yielding a clear solution. When tested against houseflies by the Peet-Grady method, an insecticidal composition consisting of 300 milligrams of the product of the foregoing example and 30 milligrams of pyrethrins in 100 cc. of odorless base oil, showed a knockdown of 90.8% and a kill of 84.6% as compared with an OTI knockdown of 90.2% and a kill of 38%, showing that the freshly prepared product was a valuable synergist for pyrethrins.

Similarly tested at a concentration of 200 milligrams of the product of this example and 25 milligrams of pyrethrins per 100 cc. of the odorless base oil, there was obtained a knockdown of 90% and a kill of 78%, as compared with the OTI knockdown of 96% and a kill of 46%. At a concentration of 500 milligrams of this product and 50 milligrams of allethrin per 100 cc. of the base oil, there was obtained a knockdown of 93% and a kill of 83%, as compared with the OTI knockdown of 96% and kill of 53%.

After standing for 10 months, 1.5 grams of the above-described product was mixed with 7.5 cc. of pyrethrin concentrate No. 20 and the resultant mixture was found to contain a substantial amount of insoluble material, indicating that considerable disproportionation had occurred. When this aged product was tested against houseflies by the Peet-Grady method, a concentration of 300 milligrams of this 10-month-old product and 30 milligrams of allethrin in 100 cc. of odorless base oil showed a knockdown of 73.7% and a kill of 51.1% as compared with the OTI knockdown of 92.8% and a kill of 51.3%, indicating loss in synergistic effectiveness due to aging.

The effectiveness of the presence of di(ethoxyethoxyethyl) acetal in inhibiting disproportionation of the desired unsymmetrical acetal is illustrated by the following examples.

Example II

In this operation, as in the preceding example, the primary reactants were 3,4-methylenedioxyphenyl isopropyl thioethyl alcohol, and vinyl ethoxyethoxyethyl ether. However, in the present example, I used an excess of the ether and also added an amount of ethoxyethoxyethyl alcohol equivalent to the excess of ether used and thereby formed di(ethoxyethoxyethyl) acetal concurrently with the desired reaction.

More particularly, the identity and proportions of the constituents added to this operation were as follows:

3,4 - methylenedioxyphenyl
  isopropyl thioethyl
  alcohol _____ 60 grams (0.25 mole).
Vinyl ethoxyethoxyethyl
  ether _____ 60 grams (0.375 mole).
Ethoxyethoxyethyl
  alcohol _____ 16.75 grams (0.125 mole).
Toluenesulfonic acid _____ 0.02 grams.

Both of the alcohols and the toluenesulfonic acid were added to 50 cc. of benzene, the resultant mixture cooled to about 3° C. The ether was then added thereto dropwise with stirring over a period of 13 minutes, while maintaining the temperature of the mixture between 3° C. and 4° C. After standing for one hour at the above-indicated temperature, the acid was neutralized by adding to the mixture an equivalent amount of sodium hydroxide in methanol and the mixture filtered to remove the resultant salt. After standing for an additional 3 hours, the benzene was removed as described in the preceding example, yielding 135.5 grams of the reaction product, as compared with the calculated yield of 136.75 grams.

A test of this freshly-prepared product against houseflies by the Peet-Grady method at a concentration of 300 milligrams of the product and 30 milligrams of pyrethrins in 100 cc. of odorless base oil showed a knockdown of 82.1% and a kill of 71.2% as compared with an OTI knockdown of 82% and a kill of 32.9%.

Thus the product showed a knockdown equal to that of the OTI and a kill greatly in excess of the OTI kill.

Example III

In this operation, the following materials were used in the indicated proportions:

Piperonyl alcohol _____ 38 grams (0.25 mole).
Vinyl ethoxyethoxyethyl
  ether _____ 60 grams (0.375 mole).
Ethoxyethoxyethyl
  alcohol _____ 16.75 grams (0.125 mole).
Toluenesulfonic acid _____ 0.02 gram.

Both of the alcohols and the acid were mixed with 50 cc. of benzene and the mixture cooled to 3° C. The ether was then added dropwise over a period of 11 minutes while maintaining the temperature of the mixture within the range of 3°–4° C. After standing for about one hour at the indicated temperature, the acid was neutralized by an equivalent amount of sodium hydroxide in methanol. After standing for an additional 3 hours, the benzene was distilled off at reduced pressure by heating to a temperature of 95° C. resulting in a yield of 114.5 grams of product as compared with a calculated yield of 114.75 grams.

Example IV

In this operation, the following constituents were used in the indicated proportions:

3,4-methylenedioxyphenyl
  propyl thioethyl alcohol ____ 60 grams (0.25 mole).
Vinyl ethoxyethoxyethyl ether _ 40 grams (0.25 mole).
Toluenesulfonic acid _____ 0.02 gram.

The methylenedioxyphenyl propyl thioethyl alcohol was first dissolved in 50 cc. of benzene containing the acid catalyst. This solution was then cooled at 4° C. and the vinyl ethoxyethoxyethyl ether was added dropwise with stirring over a period of 9 minutes, during which time the temperature rose to about 6° C. The cooled solution was then permitted to stand for about one hour and the acid therein was neutralized by adding the equivalent of sodium hydroxide in methanol. After standing for an additional one and one-half hours, the salt formed by the neutralization was filtered from the solution and the benzene was distilled therefrom at reduced pressure by heating to about 50° C. The product obtained weighed 101 grams, as compared with a calculated yield of 100 grams.

When tested against houseflies by the Peet-Grady method, a concentration of 300 milligrams of the product of the foregoing example and 30 milligrams of pyrethrins in 100 cc. of odorless base oil showed a knockdown of 86.3% and a kill of 74.4%, as compared with the OTI knockdown of 90.2% and a kill of 38%.

Example V

In this operation, the following constituents were used in the indicated proportions:

3,4-methylenedioxyphenyl
  isopropyl thioethyl
  alcohol _____ 60 grams (0.25 mole).
Vinyl methoxyethyl
  ether _____ 25.5 grams (0.25 mole).
Toluenesulfonic acid _____ 0.02 gram.

In carrying out the reaction, the methylenedioxyphenyl isopropyl thioethyl alcohol was dissolved in 50 cc. of benzene containing the acid catalyst and the solution was cooled to 3° C. Thereafter, the ether was added to the solution dropwise over a period of 5 minutes. Upon adding the ether, heat was generated and cooling was employed, the generation of heat continuing for about 29 minutes. Thereafter, the mixture was permitted to stand for one hour and the acid was then neutralized by adding the equivalent of sodium hydroxide in methanol. Several hours later, the salt was filtered from the solution and the benzene distilled from the solution at reduced pressure by heating to about 54° C. There was obtained a yield of 86 grams of product, as compared with the theoretical yield of 85.5 grams.

It will be understood that the OTI, i.e., Official Test Insecticide, referred to herein, is composed of 100 milligrams of pyrethrins dissolved in 100 cc. of an odorless base oil of the type conventionally used as the vehicle in such insecticidal compositions.

I claim:
1. A composition consisting essentially of an unsymmetrical acetal of the formula

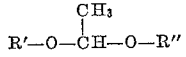

in which R' is a radical selected from the group consisting of piperonyl, safrole thioethyl and isosafrole thioethyl and R'' is a monovalent radical

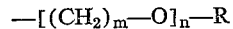

in which R is alkyl of from 1 to 4 carbon atoms, $m$ is an integer from 2 to 3 and $n$ is an integer from 1 to 2, stabilized against disproportionation by the presence of a minor proportion of a corresponding symmetrical acetal

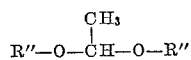

R'' being a monovalent radical as defined above.

2. A composition of claim 1 in which the radical R' is piperonyl and the radical R'' is ethoxyethoxyethyl.

3. A composition of claim 1 in which the radical R' is safrole thioethyl and the radical R'' is ethoxyethoxyethyl.

4. A composition of claim 1 in which the radical R' is isosafrole thioethyl and the radical R'' is methoxyethyl.

5. A composition of claim 1 in which the radical R' is isosafrole thioethyl and the radical R" is ethoxyethoxyethyl.

6. A composition of claim 1 in which the radical R' is safrole thioethyl and the R" is methoxyethyl.

7. Method for producing a composition of claim 1 which comprises reacting a high-boiling alcohol selected from the group consisting of piperonyl alcohol, safrole thioethyl alcohol and isosafrole thioethyl alcohol with a vinyl ether of the formula $$CH_2=CH_2-[-O-(CH_2)_m-]_n-R$$

in which R is alkyl of from 1 to 4 carbon atoms, $m$ is an integer from 2 to 3 and $n$ is an integer from 1 to 2, by gradually adding the ether to a solution of the alcohol in a nonreactive volatile solvent containing a strong nonvolatile acid catalyst selected from the group consisting of toluenesulfonic acid, naphthalenesulfonic acid and benzenesulfonic acid, with stirring, while maintaining the temperature of the mixture within the range from about 0° to about 10° C.

8. The process of claim 7 in which the amount of the vinyl ether added is in excess of that required for the reaction and there is inclined in the reaction mixture an amount of an alcohol of the formula $$HO-[-O-(CH_2)_m-]_n-R$$

R, $m$ and $n$ being identical with those of the ether, the amount of the last said alcohol being equivalent to the excess of the ether used.

9. The process of claim 8 in which the excess of the vinyl ether is approximately one-half of that theoretically required to react with the high-boiling alcohol.

10. The process of claim 7 in which the volatile solvent is benzene.

References Cited in the file of this patent

UNITED STATES PATENTS

| | | |
|---|---|---|
| 2,431,844 | Synerholm | Dec. 2, 1947 |
| 2,485,681 | Wachs | Oct. 25, 1949 |
| 2,494,458 | Synerholm | Jan. 10, 1950 |
| 2,550,737 | Wachs | May 1, 1951 |
| 2,764,517 | Beroza | Sept. 25, 1956 |
| 2,832,792 | Beroza | Apr. 29, 1958 |
| 3,070,607 | Barthel et al. | Dec. 25, 1962 |

OTHER REFERENCES

The Merck Index, 7th ed., 1960, pub. by Merck & Co., Inc., Rahway, N.J., pages 518 and 915.

Sweeney: Chemical Abstracts, vol. 52, page 643e, 1958.

Beroza: Journal of Agr. and Food Chem., vol. 4, No. 1, pages 49 to 53 (1956).

Moore et al.: Jour. of the Science of Food and Agr., vol. 9, pages 666–672 (1958).

Prill et al.: "Contributions From Boyce Thompson Institute," vol. 14, pages 134 and 137 (1946).

Alexander et al.: "J. Org. Chem." vol. 23, pages 1969–1970 (1958).

Prill et al.: Contributions From Boyce Thompson Institute," vol. 14, pages 127 and 137 to 138 (1946).

UNITED STATES PATENT OFFICE
CERTIFICATE OF CORRECTION

Patent No. 3,117,136                            January 7, 1964

Oscar F. Hedenburg

It is hereby certified that error appears in the above numbered patent requiring correction and that the said Letters Patent should read as corrected below.

Column 4, line 14, for "effective" read -- effectiveness --; line 70, for "the" read -- an --; column 7, line 23, for "inclined" read -- included --.

Signed and sealed this 16th day of June 1964.

(SEAL)
Attest:

ERNEST W. SWIDER
Attesting Officer

EDWARD J. BRENNER
Commissioner of Patents